United States Patent [19]
Cherry

[11] Patent Number: 5,980,845
[45] Date of Patent: Nov. 9, 1999

[54] REGENERATION OF HYDROGEN SULFIDE SCAVENGERS

[76] Inventor: Doyle Cherry, 1423 Bayshore Dr., Kemah, Tex. 77565

[21] Appl. No.: 08/852,227

[22] Filed: May 6, 1997

Related U.S. Application Data

[63] Continuation-in-part of application No. 08/549,015, Oct. 27, 1995, Pat. No. 5,688,478, which is a continuation-in-part of application No. 08/350,635, Dec. 7, 1994, Pat. No. 5,462,721, which is a continuation-in-part of application No. 08/295,270, Aug. 24, 1994, abandoned.

[51] Int. Cl.$^6$ .............................. C10B 17/16; C09K 3/00; C10G 29/22
[52] U.S. Cl. ................... 423/229; 208/48 AA; 208/236; 208/237; 208/240; 252/189; 252/190; 423/226; 423/228
[58] Field of Search ..................................... 252/189, 190; 208/48 AA, 240, 237, 236; 423/226, 228, 229

[56] References Cited

U.S. PATENT DOCUMENTS

| | | | |
|---|---|---|---|
| 4,748,011 | 5/1988 | Baize | 423/228 |
| 4,978,512 | 12/1990 | Dillon | 423/226 |
| 5,347,004 | 9/1994 | Rivers et al. | 544/180 |
| 5,405,591 | 4/1995 | Galloway | 423/228 |
| 5,462,721 | 10/1995 | Pounds et al. | 423/226 |
| 5,480,860 | 1/1996 | Dillon | 423/228 |
| 5,554,349 | 9/1996 | Rivers et al. | 423/228 |
| 5,688,478 | 11/1997 | Pounds et al. | 423/228 |
| 5,705,090 | 1/1998 | Garland et al. | 252/184 |
| 5,750,083 | 5/1998 | Mimura et al. | 423/228 |
| 5,770,041 | 6/1998 | Lewis et al. | 208/48 AA |

Primary Examiner—Richard D. Lovering

[57] ABSTRACT

The present invention generally provides sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

14 Claims, 6 Drawing Sheets

REGENERATION OF HYDROGEN SULFIDE SCAVENGERS

This application is a continuation-in-part application of U.S. patent application Ser. No. 08/549,015 filed on Oct. 27, 1995, now U.S. Pat. No. 5,688,478, which is a continuation-in-part application of U.S. patent application Ser. No. 08/350,635 filed on Dec. 7, 1994 now U.S. Pat. No. 5,462,721, which is a continuation-in-part application of U.S. Pat. application Ser. No. 08/295,270, filed on Aug. 24, 1994, now abandoned.

BACKGROUND OF THE INVENTION

1. Field of the Invention

The present invention relates to hydrogen sulfide scavengers and methods of making and using the scavengers. More particularly, the invention relates to the increasing the capacity of a scavenger to remove sulfides from gaseous or liquid hydrocarbon streams, aqueous systems or mixture thereof.

2. Background of the Related Art

Hydrocarbons are typically found as gases or liquids located in geological formations beneath the earth's surface. These hydrocarbons may be produced by drilling a well into the formations. Gaseous hydrocarbons, typically referred to as natural gas, are frequently found to contain water, carbon dioxide and sulfides, such as hydrogen sulfides and mercaptans. Natural gas containing sulfides is referred to as being "raw" or "sour," due to its strong malodorous smell. However, the concentration of sulfides in natural gas will vary from formation to formation and perhaps over time. For example, the methane content of natural gas will typically vary between 45 and 96 percent and the hydrogen sulfide content will typically vary between 0.1 and 150,000 parts per million (ppm).

For many applications, it is desirable to remove some or substantially all the sulfides from the gas. For example, since hydrogen sulfide in the presence of water is corrosive to steel, it is desirable to removed substantially all of the hydrogen sulfide from natural gas before its use and preferably before transporting the gas or processing the gas in oil field equipment, pipelines and refineries. As a result, many pipeline specifications limit the amount of hydrogen sulfide to less than 0.25 grains per 100 cubic feet of gas. Accordingly, removal of hydrogen sulfide from hydrocarbons, such as natural gas, crude oil and refined oil products, is an important concern. Further, because of the large quantities of hydrocarbon materials that contain sulfides, it is important to have a means of removal that does not harm the environment and is economically efficient.

This removal is conventionally accomplished using gas processing plants which are typically located in the field and vary in size from small units located at each wellhead to larger, centrally located plants servicing multiple wells. These plants may be nothing more than a single bubble column or a multi-stage process involving continuously regenerable reagents.

These gas processing plants are typically provided with a solution containing a sulfide scavenging component which contacts the natural gas stream and reacts with the sulfides contained in the gas. Scavenging components, otherwise known as scavengers, that have been used to date have included formaldehyde, sodium nitrite, triazines and imines. However, certain of these scavengers have proven unsatisfactory for a variety of reasons. For example, formaldehyde has been found to be carcinogenic and requires careful handling and expensive disposal.

In recent years, the most widely used scavengers have been the triazines, particularly those formed by the reaction of formaldehyde and monoethanolamine. The popularity of this triazine scavenger is primarily due to its good scavenging capacity and low cost. However, triazine solutions may contain free formaldehyde if the triazine forming reaction is performed with excess formaldehyde. Furthermore, the reaction of triazines with the sulfides will lead to the formation of solids if the triazine solution is used to exhaustion. These solids represent a significant disposal problem and must be carefully cleaned from the scavenging process vessels.

Despite the predominant use of triazine scavengers, there remains a need for a sulfide scavenger solutions and processes that operate efficiently and effectively. It would be desirable if the scavenger solution and process reduced or eliminated solids formation and eliminated the use of toxic chemicals.

SUMMARY OF THE INVENTION

The present invention provides a sulfide scavenging composition comprising the reaction product of monoethanolamine and a plurality of aldehydes comprising at least one dialdehyde. The plurality of aldehydes may be aqueous, may further comprise formaldehyde or consist essentially of the oxidation products of ethylene glycol. The at least one dialdehyde preferably comprises ethanedial. The scavenging composition may also include excess ethanedial.

Another aspect of the invention provides a composition for scavenging sulfides, comprising a triazine and ethanedial, wherein the molar ratio of ethanedial to triazine is between about 0.5 and about 1.5, preferably about 1 or equal to 1. The triazine may be formed by the reaction of formaldehyde and monoethanolamine. It is also preferred that an equivalent of carbonyl groups in the ethanedial be provide for between about 1.5 and about 6 equivalents of hydrogen atoms bonded directly to a nitrogen atom in the liberated amine.

Another aspect of the invention provides a process comprising the steps of reacting a plurality of aldehydes and monoethanolamine. Again, he plurality of aldehydes may be aqueous, may further comprise formaldehyde or consist essentially of the oxidation products of ethylene glycol.

Yet another aspect of the invention provides a process comprising the step of reacting monoethanolamine with a solution consisting essentially of the reaction product formed by the oxidation of ethylene glycol. The process may further comprise the step of then adding ethanedial to the solution.

A further aspect of the invention provides a process comprising the step of adding ethanedial to a partially spent sulfide scavenging solution containing a carbonate of monoethanolamine for the purpose of forming a sulfide scavenger.

The invention also provides a process comprising the steps of scavenging sulfides with a solution having at least one scavenger comprising a triazine, then adding ethanedial to the solution; and then scavenging additional sulfides. The process may further comprise the step of adding monoethanolamine to the solution.

Further, the invention provides a process comprising the steps of removing sulfides from a gas with a solution having at least one scavenger comprising the reaction product of an aldehyde and an amine, adding ethanedial to a portion of the solution, and removing additional sulfides from the gas with the solution. The aldehyde may be formaldehyde and the amine may be monoethanolamine, perhaps forming a triazine. More preferably, the aldehyde is ethanedial and the amine is monoethanolamine. The process may further comprise the step of discarding a second portion of the solution that is substantially spent.

An additional aspect of the invention provides a method comprising the step of adding ethanedial to a sulfide scavenger derived from monoethanolamine for the purpose of reacting with monoethanolamine or derivatives of monoethanolamine liberated from the sulfide scavenger upon exposure to sulfides. The invention also provides a method comprising the step of adding ethanedial to a solution comprising a sulfide scavenger derived from monoethanolamine for the purpose of reacting with a reaction product formed when the sulfide scavenger reacts with sulfides. The invention further provides a method of scavenging sulfides comprising the step of contacting a sulfide-containing gas with a solution comprising ethanedial and a sulfide scavenger derived from monoethanolamine, and may further comprise the step of passing a sulfide containing gas through the vessel.

Finally, the invention provides a process comprising the steps of reclaiming monoethanolamine or a derivative of monoethanolamine from a first scavenger stream, and reacting the reclaimed monoethanolamine or derivative of monoethanolamine with an aldehyde to form a second scavenger stream. The process may farther comprise the step of reacting sulfides from a gas stream with a scavenger containing triazines.

BRIEF DESCRIPTION OF THE DRAWINGS

So that the manner in which the above recited features and advantages of the present invention are attained can be understood in detail, a more particular description of the invention, briefly summarized above, may be had by reference to the embodiments thereof which are illustrated in the appended drawings. It is to be noted, however, that the appended drawings illustrate only typical embodiments of this invention and are, therefore, not to be considered limiting of its scope, for the invention may admit to other equally effective embodiments.

DETAILED DESCRIPTION OF A PREFERRED EMBODIMENT

Figure 1:
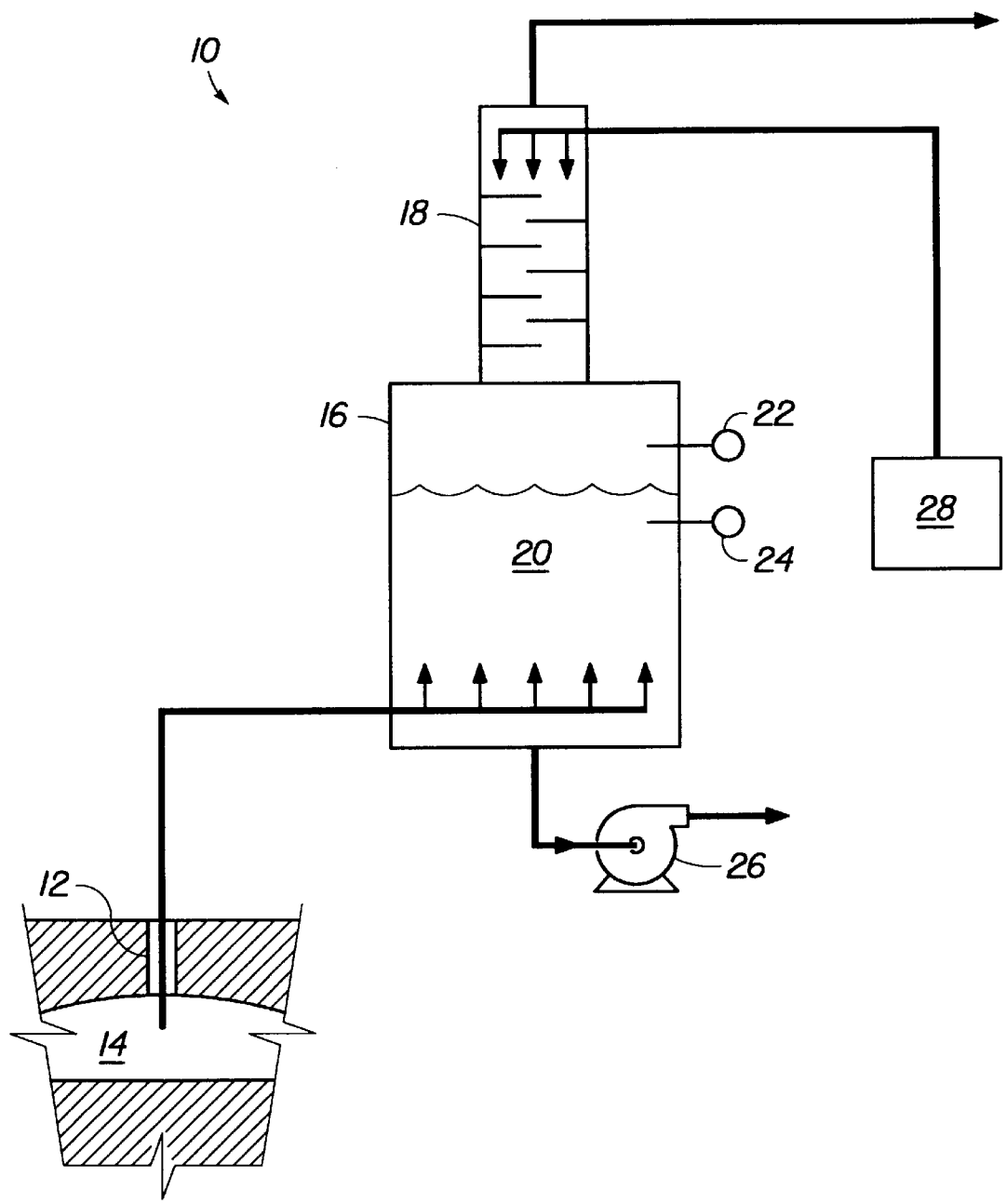
FIG. 1 is a schematic flow diagram of a single vessel system for scavenging sulfides from natural gas.

The present invention generally provides sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives or forms of amines that are liberated when certain scavenger solutions react with sulfides, including hydrogen sulfide and mercaptans. The scavenger solutions that have been discovered to liberate amines upon reaction with sulfides are those formed by a reaction between an amine and an aldehyde, such as scavengers formed by the reaction between monoethanolamine and formaldehyde, the reaction between monoethanolamine and ethanedial and the reaction between monoethanolamine and a mixture containing both formaldehyde and ethanedial.

For example, sulfide scavenger solutions containing triazines are commonly formed by the 1:1 molar reaction of monoethanolamine and formaldehyde. More specifically, three moles of monoethanolamine and three moles of formaldehyde are necessary to form one mole of triazine. One mole of triazine has now been found to scavenge about two moles of sulfides and liberate between about one and about two moles of monoethanolamine, a derivative of monoethanolamine or its functional equivalent. Therefore, the present invention provides ethanedial to react with the liberated amine and form a reaction product that is further capable of scavenging sulfides. In this manner, the scavenging solution is described herein as being partially regenerable.

The scavengers of the present invention may be prepared by reacting the amine and aldehyde in an active-hydrogen:carbonyl group ratio of between about 0.5 and about 3. However, it is preferred that the reactants be present in the ratio of two equivalents of active hydrogen in the amine for each carbonyl group equivalent in the aldehyde. An "active hydrogen," as used herein, is a hydrogen atom bonded directly to a nitrogen atom. Thus, one mole of a primary amino group ($NH_2$) has two active hydrogens and is therefore capable of reacting with one carbonyl group equivalent, wherein the carbonyl group equivalent may be provided either by one mole of a monoaldehyde or by one-half mole of a dialdehyde. Two moles of a secondary amino group (NH) has one active hydrogen and is therefore capable of reacting with one-half carbonyl group equivalent (CHO group). A tertiary amino group will not react with an aldehyde to form a stable compound when the manufacturing procedures of this invention are followed.

One aspect of the invention provides a composition comprising the reaction product of a plurality of aldehydes and an amine, preferably monoethanolamine. Preferably, the plurality of aldehydes include formaldehyde and at least one dialdehyde, most preferably ethanedial. A convenient and preferred source of the plurality of aldehydes is the reaction product produced by the catalytic oxidation of ethylene glycol. After reacting the plurality of aldehydes with monoethanolamine, it may be desirable to add excess ethanedial in order to allow for subsequent in-situ regeneration of liberated monoethanolamine, carbonates of monoethanolamine, and derivatives of monoethanolamine.

Another aspect of the invention provides a composition comprising the reaction product of an amine carbonate, such as monoethanolamine carbonate, and ethanedial. An amine carbonate is believed to be formed in the scavenger solution when the liberated amine comes into contact with carbon dioxide in the natural gas stream. This may be the primary form of the liberated amine, particularly where the scavenging is performed in a multiple stage process before the liberated amine is regenerated with ethanedial. Although the exact nature of the amine carbonate is not known, it is preferred that about one-half mole of ethanedial be reacted with each mole of amine carbonate.

Yet another aspect of the invention provides a sulfide scavenger solution comprising a triazine and ethanedial.

Because the amount of amine being liberated from a triazine is now known, it is possible to provide a sulfide scavenger solution that contains a sufficient amount of ethanedial to react with the amine (or the amine carbonate) as it is being liberated. Just as the original triazines liberate amines that are regenerable with ethanedial to form secondary scavengers, these secondary scavengers may also liberate amines that are themselves regenerable. Therefore, the amount of ethanedial provided may account for the full or partial extent of the regeneration desired, preferably making consideration for the minimum tolerable strength of the scavenging solution before it must be discarded. While adding any amount of ethanedial is deemed beneficial in accordance with the invention, the molar ratio of ethanedial to triazine is preferably greater than about 1.

An additional aspect of the invention provides a process comprising the steps of reacting a plurality of aldehydes with monoethanolamine. The plurality of aldehydes may be aqueous and preferably include at least one dialdehyde, especially ethanedial. In the case of a ready-made scavenger solution, the most preferred plurality of aldehydes will be those formed by the catalytic oxidation of ethylene glycol, typically comprising about 18 percent formaldehyde and about 22 percent ethanedial. Additional ethanedial may be supplied to the reaction product as desired for purposes of regeneration of liberated amines.

A further aspect of the invention provides a process comprising the step of reacting monoethanolamine or a carbonate of monoethanolamine with ethanedial for the purpose of forming a sulfide scavenger. One embodiment of the invention, comprises the steps of: (a) scavenging sulfides with a solution having at least one scavenger comprising the reaction product of an amine and an aldehyde; then (b) adding ethanedial to the solution; and then (c) scavenging additional sulfides. Optionally, the process may further comprise the step of (d) adding monoethanolamine to the solution along with the ethanedial. Such processes may be performed in either a batch mode, a semi-batch mode or, most preferably, a continuous mode. In the continuous mode, a first portion of the scavenger solution is discarded following exposure to sulfides and a second portion is regenerated by addition of ethanedial and recycled for addition contact with sulfides. Most preferably, the amine is monoethanolamine and the aldehyde is ethanedial. It should be recognized that the present invention encompasses both the on-site generation of the scavenger and the manufacturing of the scavenger in a centralized plant for distribution to a large number of scavenging plants.

The invention also includes a method comprising the step of adding ethanedial to a sulfide scavenger derived from monoethanolamine for the purpose of reacting with monoethanolamine or derivatives of monoethanolamine liberated from the sulfide scavenger upon exposure to sulfides.

A process is also provided comprising the step of reacting reclaimed monoethanolamine with ethanedial. Similarly, the process may comprise the steps of reclaiming monoethanolamine or a derivative of monoethanolamine from a first scavenger stream and reacting the reclaimed monoethanolamine or derivative of monoethanolamine with an aldehyde to form a second scavenger stream. The process may further comprising the step of reacting sulfides from a gas stream with a scavenger containing triazines.

Finally, the invention provides a method of scavenging sulfides comprising the step of contacting a sulfide-containing gas with a solution comprising ethanedial and a sulfide scavenger including a reaction product of an amine and an aldehyde. The preferred amine is monoethanolamine and the preferred aldehydes are ethanedial, formaldehyde or a combination thereof.

It should be recognized that the molar ratios discussed herein are the theoretical amounts required to produce the desired reaction. However, reaction kinetics and equilibrium may dictate that the actual amounts of one reactant or another vary slightly from the theoretical requirement. Furthermore, it may be desirable in some embodiments of the invention, such as in the on-site generation of a scavenger solution, that the reactant solutions be diluted for processing convenience and provision of sufficient solvent, such as water. It is preferred that the amine solution and the ethanedial solution be sufficiently diluted so that a 1:1 volumetric ratio of the solutions provides a 2:1 molar ratio of active hydrogens in the amine to carbonyl groups in the ethanedial.

In general, the scavenging compounds of the present invention are prepared by the exothermic reaction of the amines, or blends of amines, with any C1 to C4 aldehydes. The preferred monoaldehydes include, but are not limited to, formaldehyde, acetaldehyde, propionaldehyde (propanal), and n-butyraldehyde (1-butanal), most preferably formaldehyde. The preferred dialdehyde is ethanedial.

Following the ratio of one carbonyl group equivalent per two equivalents of active hydrogen, the reaction product of the present invention allows for a stoichiometrically balanced hydrogen sulfide scavenger having substantially no free aldehyde. A stoichiometrically balanced reaction is primarily important when using a suspect carcinogenic monoaldehyde, such as formaldehyde. Furthermore, where the base scavenger solution is formed from formaldehyde, it is still preferred that ethanedial be used for the regeneration of the liberated amine. Because of the low toxicity of ethanedial, it is less critical to maintain a stoichiometric balance and, in fact, may be desirable to provide excess glyoxal in the scavenger solution to allow regeneration to occur simultaneously with the liberation of amine. It is also acceptable to maintain a storage tank of free ethanedial on-site for to use in the regeneration, whereas free formaldehyde is considered to be extremely hazardous.

The aldehydes of the present invention may or may not contain water as their only solvent or may contain water with various amounts of methanol ranging from about 4% to about 25%. Methanol and/or water can be utilized in the scavenger solution to reduce the viscosity for use in natural gas applications. In addition, methanol, isopropanol and/or ethylene glycol can be added to the solution to act as an antifreeze, which may be desirable for use in colder climates.

In accordance with the methods and apparatus disclosed herein, sulfide scavenger solutions may be prepared by reacting an amine and aldehyde in any effective ratio. However, it is preferred that the scavengers be prepared by reacting the amine and aldehyde in an active-hydrogen:carbonyl-group ratio of between about 0.5 and about 6. It is most preferred that the active-hydrogen:carbonyl-group ratio be about 2, regardless of the specific amine or aldehyde, so that the reaction product is stoichiometrically balanced.

Ethanedial is the preferred dialdehyde for use in preparing the dialdehyde-based scavengers of the present invention or for regeneration of liberated amine(s). Ethanedial may be obtained and used in any concentration, including anhydrous solutions, but the preferred solution contains about 40% ethanedial in water.

Monoethanolamine (MEA) is the preferred alkanolamine for use in preparing aldehyde or dialdehyde based scavengers and may be used in any concentration, including anhydrous solutions. For use in cold climates, a solution having about 85% MEA may be preferred because it has a freezing point that is lower than more concentrated MEA solutions, such as a solution having greater than about 99% MEA. However, when the freezing point is not of concern, such as in a production facility for production of scavenging solutions, a more concentrated MEA solution is preferred, for example a solution having about 99% MEA or greater. The more concentrated MEA will produce a more concentrated scavenging solution and reduce the costs of shipping the solution from the manufacturing plant to various scavenging plants.

The most preferred reaction product is prepared by reacting a stoichiometrically balanced amount of monoethanolamine with ethanedial. This stoichiometrical balance is achieved at a ratio of 2 active hydrogens per carbonyl group. It is preferred that the temperature of this exothermic reaction be maintained below about 200° F. It is most preferred that the temperature of this exothermic reaction be maintained between about 120 and about 150° F. The exact structure of this reaction product has yet to be determined. Preliminary gas chromatograph, mass spectrograph, and NMR analysis performed on the reaction product has produced no evidence that triazines or imines are present.

The color of the reaction product is effected both by the ratio of reactants and by the temperature of the reaction. At or near a stoichiometrically balanced reaction, occurring below about 120° F., the reaction product will take on a transparent redish yellow tint. When the reaction takes place at temperatures between about 120 and about 150° F., the product will have a medium redish brown coloration. It has been found that as the amine/aldehyde reaction temperature increases above this range, the reaction product will have an increasingly darker and less transparent appearance. When the reaction product reacts with sulfides, the darkness and opaqueness of the product will continue to increase until the product is substantially spent and has a very dark or black, non-transparent coloration.

Additionally, regardless of the exact active hydrogen:carbonyl ratio, a monoethanolamine/ethanedial reaction product, even using liberated monoethanolamine, shows less tendency to form solids in a system when reacted with hydrogen sulfide and/or mercaptans than other products presently commercially available. It is also a considerable advantage that scavenger solutions made with ethanedial have absolutely no odor when fresh or when spent. The nonodorous nature of the product is particularly desirable for applications in close proximity to residential areas or in production environments where personnel are present.

When sweetening gas, the addition of selected surfactants to a hydrogen sulfide scavenger will typically enhance the performance of the scavenger by promoting intimate contact between the scavenger and the hydrogen sulfide in the gas. Surfactants are especially useful in systems where aqueous and/or hydrocarbon fluids are present and tend to interfere with contact. Applications where gas is sweetened through use of in-line injection, scrubbing towers, or a combination of the two benefit the most from surfactants. When surfactant-containing scavengers are used in contact towers (scrubbers), the foam height within the tower may be controlled by type and amount of surfactant employed as well as the adjustment of the fluid level within the tower. In this way, carryover problems may be avoided.

All surfactants may be used in selected hydrogen scavenger applications. The surfactants may be nonionic, anioic, cationic, amphoteric, or combinations thereof. An example of a nonionic surfactant useful in combination with the alkanolamine/ethanedial scavenger is the reaction product of nonylphenol and between about 10 and about 12 moles of ethylene oxide.

Surfactants can be used to fine tune a formulation for application in specific circumstances, such as tower height, in-line injection, hydrogen sulfide concentration, and the like. The amount of surfactant that is added to the scavenger of the present invention may be any amount, but will typically vary from about 0.05% to about 5% by volume of the total scavenger solution depending on the particular application. The preferred surfactant concentrations are less than one percent (1.0%).

The sulfide scavengers of the present invention may be manufactured in centralized manufacturing plants, on-site or a combination of the two locations. For on-site generation of scavengers, ethanedial is the most preferred aldehyde due to its low toxicity. For centralized manufacture of scavengers, it is cost effective to use the formaldehyde/ethanedial stream produced by the catalytic oxidation of ethylene glycol. This formaldehyde/ethanedial stream is typically separated to provide a formaldehyde stream and an ethanedial stream. However, in accordance with the present invention, this mixed aldehyde stream may be used effectively to produce scavengers, either alone or in combination with different aldehydes or a separated stream of ethanedial.

The sulfide scavengers of the present invention can be applied in various ways. When sweetening natural gas, the scavenger can be placed into various gas/liquid contacting devices, such as bubble columns, spray columns, columns or towers having packing or trays, well-head injectors, in-line injectors, in-line static mixers (with or without atomization). The gas/liquid contacting devices may be used alone or in various combinations (including one or more similar units), in series or parallel, and in any useful order depending upon the particular application, as will be recognized in the art. Multiple injection points or contacting towers may be utilized as necessary to accommodate the volume of gas and/or the hydrogen sulfide levels specified. Furthermore, the scavengers may be applied in a manner consistent with new or existing equipment, such as a batch process, a semi-batch process or, most preferably, a continuous process.

The scavengers and processes of making and using the scavengers of the present invention may include in-situ, ex-situ or a combination of in-situ and ex-situ regeneration of liberated amines. In-situ regeneration of amines, as used herein, refers to applications having excess ethanedial present in the scavenging solution so that liberated amines may be reacted without requiring a separate reactor. Ex-situ regeneration of liberated amines, as used herein, refers to application having reactors that are separate from the gas/liquid contacting devices for reacting ethanedial with the liberated amines.

Furthermore, the sulfide scavengers of the present invention may also be used in conjunction with crude oil, various hydrocarbon streams in refineries, sewage treatment plants (i.e., sewage gas for odor control and removing sulfides from anaerobic digesters), and the like. The scavengers may also be useful for removing sulfides in other applications, streams, gases and liquids, although not specifically mentioned, as will be apparent to one of skill in the art.

The rapid reaction that occurs between alkanolamines and ethanedial and the lower toxicity of ethanedial, as compared to formaldehyde, are important characteristics for on-site and on-demand manufacturing of a organic sulfide scavenger formed by the reaction between an alkanolamine and ethanedial.

FIG. 1 is a schematic flow diagram of a single vessel system for scavenging sulfides from natural gas. Natural gas is produced through a well bore 12 extending into a gas producing formation 14. The gas is transported out of the formation under its own pressure or with a pump (not shown) and into a bubble column 16, a spray column 18, other liquid/gas contacting devices or combinations of devices. In the case of the bubble column 16 and spray column 18 of FIG. 1, the gas is released into bubble column 16 at a point under the scavenger solution 20, which is preferably maintained at a level between about 45 and about 85 percent full. The gas rises through the liquid scavenger solution 20, disengages from the liquid, flows upward through the column 16 and column 18, and then passes out of the system 10 to some other device, such as a gas transportation pipeline.

The scavenger solution 20 is passed into the spray column 18 and bubble column 16 from a scavenger source or vessel 28. The scavenger solution contacts the gas and reacts with the sulfides in the gas to form various water-soluble compounds. The gas passing out of the columns 16, 18 will preferably contain little or no sulfides and is said to have been "sweetened." Over time, the amount of sulfides removed from the gas will approach the reactive capacity of the scavenger solution 20 and the solution 20 will begin to pass sulfides, in which case the scavenger solution is said to be "spent." When the concentration of sulfides in the gas reaches an undesirable level, the spent scavenger solution may be withdrawn from the column 16 and replaced from the scavenger source 28. More preferably, a spent scavenger stream is continuously or semicontinuously withdrawn from the column, while a substantially continuous stream of unreacted or "fresh" scavenger solution is provided into the column 18 or column 16, alone or in combination.

Level control in the bubble column 16 may be achieved in any conventional manner known in the art, such as with the use of high and low level sensor switches 22, 24. The switches are preferably in electronic communication with a controller (not shown) which controls the rate at DM which the pump 26 withdraws substantially spent scavenger solution from the bottom of the column 16 for disposal.

Figure 2:
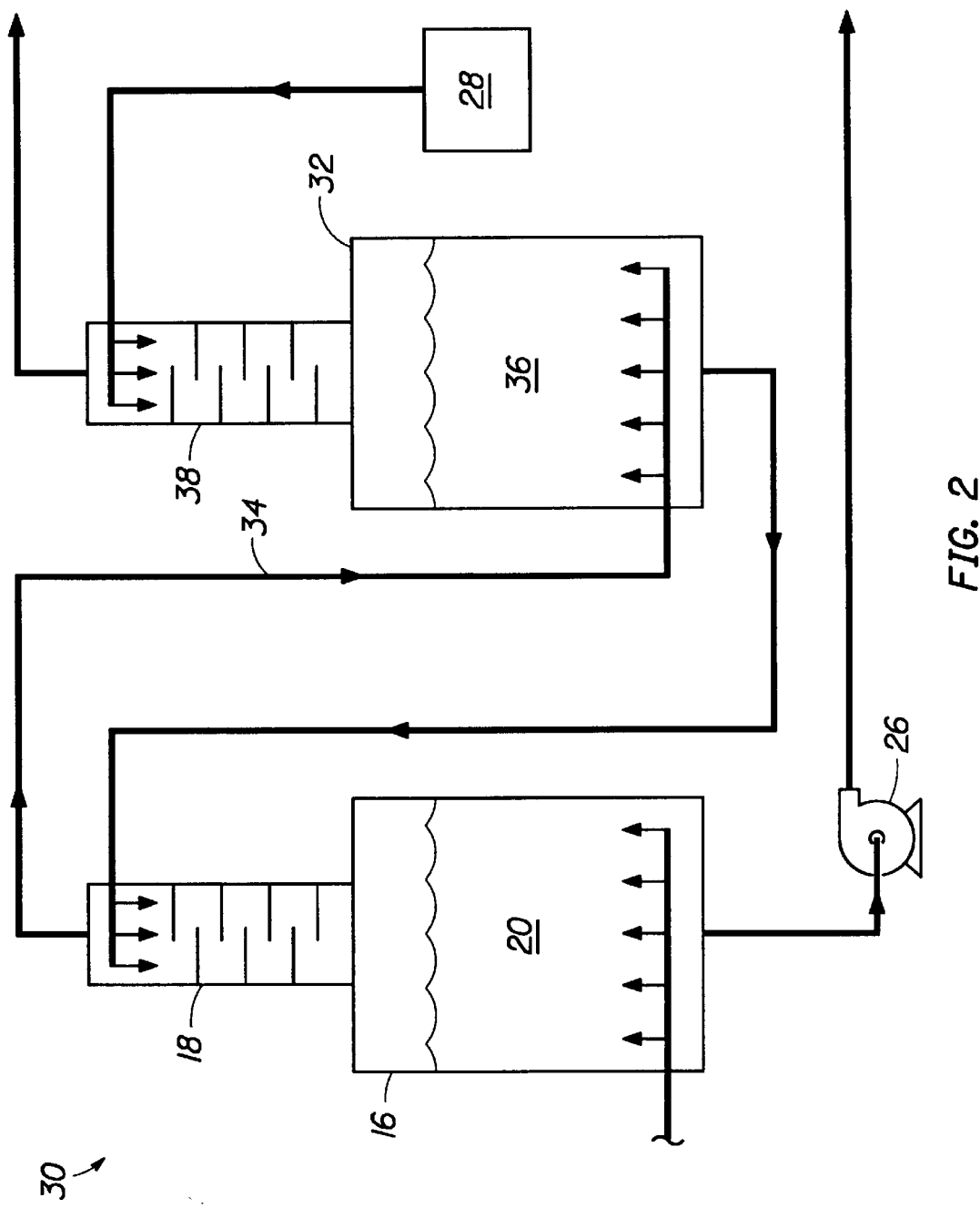
FIG. 2 is a schematic flow diagram of a dual vessel system for scavenging sulfides from natural gas.

FIG. 2 is a schematic flow diagram of a dual stage system 30 for scavenging sulfides from natural gas. The system includes two stages, each stage including a gas/liquid contacting device such as a column. As in FIG. 1, the gas enters below the scavenger 20 in bubble column 16 and exits the top of column 18. However, then the gas is transported to a second stage, such as a second bubble column 32, through a gas line 34. The gas enters column 32 below the liquid level of the scavenger solution 36, rises through and disengages from the scavenger solution 36, and exits the spray column 38 for transport to some other device, such as a gas transportation pipeline.

The scavenger source or vessel 28 now delivers scavenger solution into the spray column 38 and bubble column 32 for scavenging sulfides from the gas passing therethrough. Within the column 32, the scavenger solution 36 is preferably maintained at a level between about 25 and about 85 percent full depending on the particular system engineering for optimum contact without blow-by. The solution 36, which is partially reacted with sulfides, is withdrawn from the bottom of the column 32 (the second stage) and transferred to the top of the column 18 and into column 16 (the first stage). The solution 20 contacts more gas and reacts with more sulfides. When the solution 20 is spent or substantially spent, it is withdrawn from the column and discarded.

As already mentioned, the scavenging processes of the present invention may be carried out in batch, semi-batch or continuous modes. The system 30 provides a two-stage, counter-current flow of the scavenger solution and natural gas to obtain a high scavenging efficiency. The most reactive, fresh scavenger solution is provided to the second stage of the system (columns 32, 38) where the sulfide concentration in the gas is already reduced due to sulfide removal in the first stage (columns 16, 18).

Figure 3:
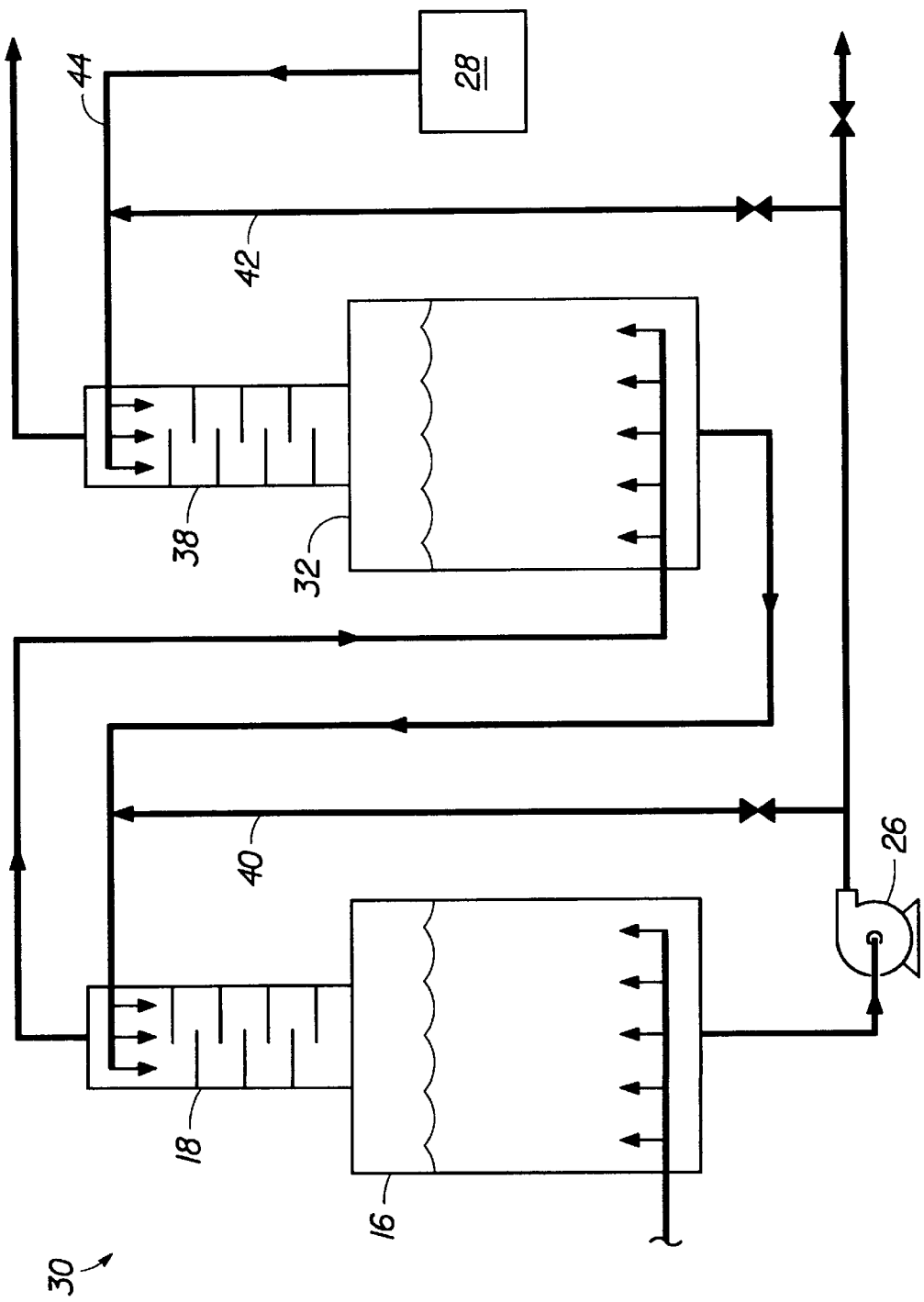
FIG. 3 is a schematic flow diagram of the system of FIG. 2 further providing for recycle of the scavenging solution.

FIG. 3 is a schematic flow diagram of the system 30 of FIG. 2 further providing for recycle of the scavenging solution in the first stage, second stage or both stages. Recycling may be beneficial for increasing the degree of contact between the gas and the liquid, for example by the increasing the volumetric flow rate of liquid being sprayed in a spray column, such as spray columns 18, 38. Furthermore, when the fresh scavenger solution provided by the source 28 contains excess ethanedial for the purpose of reacting with liberated amines, it may be desirable to provide a recycle stream 40 from either or both of the first and second stages through line 42 to the inlet of the second stage (here, column 38). The liberated amine in the line 42 will react with the excess ethanedial in the fresh solution stream 44 to form a reaction product thereof which is itself useful as a scavenger of sulfides.

Figure 4:
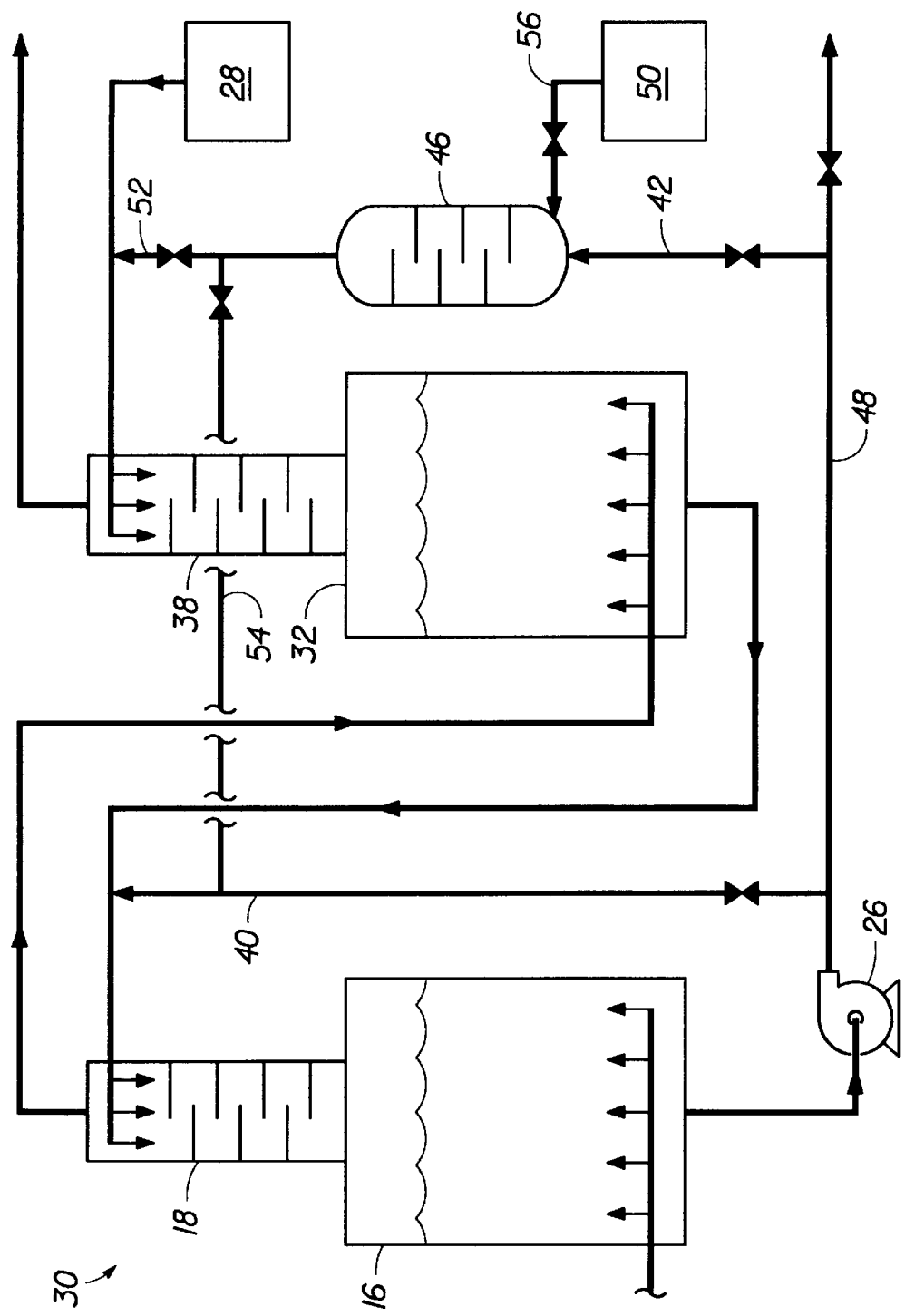
FIG. 4 is a schematic flow diagram of the system of FIG. 2 further providing a reactor vessel for regenerating a portion of the scavenging solution.

FIG. 4 is a schematic flow diagram of the system 30 of FIG. 2 further providing a reactor vessel 46 for regenerating a portion of the scavenging solution. While the scavenger solution may be regenerated at any point (such as the solution withdrawn from column 32 or any intermediate point in either column 16, 32) or several points, it is preferred to regenerate the scavenger solution withdrawn from column 16 through pump 26 to stream 48. The solution in stream 48 will be substantially spent and will contain liberated amines unless the system is otherwise provided with excess ethanedial. A first portion of the stream 48 will be discarded and a second portion of the stream 48 instead of being passed through recycle stream is passed through line 42 into the reactor 46 for regeneration. A source of a regenerant aldehyde solution 50, preferably containing ethanedial and essentially free of formaldehyde, is also provided to the reactor 46. The regenerated solution exits the reactor 46 and may be directed to either the first stage (any point in column 18 or column 16) through line 54, the second stage (any point in column 38 or column 32) through line 52, or both stages in the same of different amounts.

The relative flow rates of substantially spent solution through line 42 and the aldehyde solution through line 56 are preferably controlled to provide about two moles of active hydrogen in the liberated amine for every mole of carbonyl in the aldehyde. This ratio will theoretically yield a stoichiometrically balanced amine/aldehyde reaction product for use as a sulfide scavenger. Note that even amines in the carbonate form are considered to have two active hydrogens. Furthermore, because of the low toxicity of ethanedial it is acceptable, and perhaps preferred, to provide an excess of glyoxal and thereby allow some regeneration to take place within the contacting columns.

Figure 5:
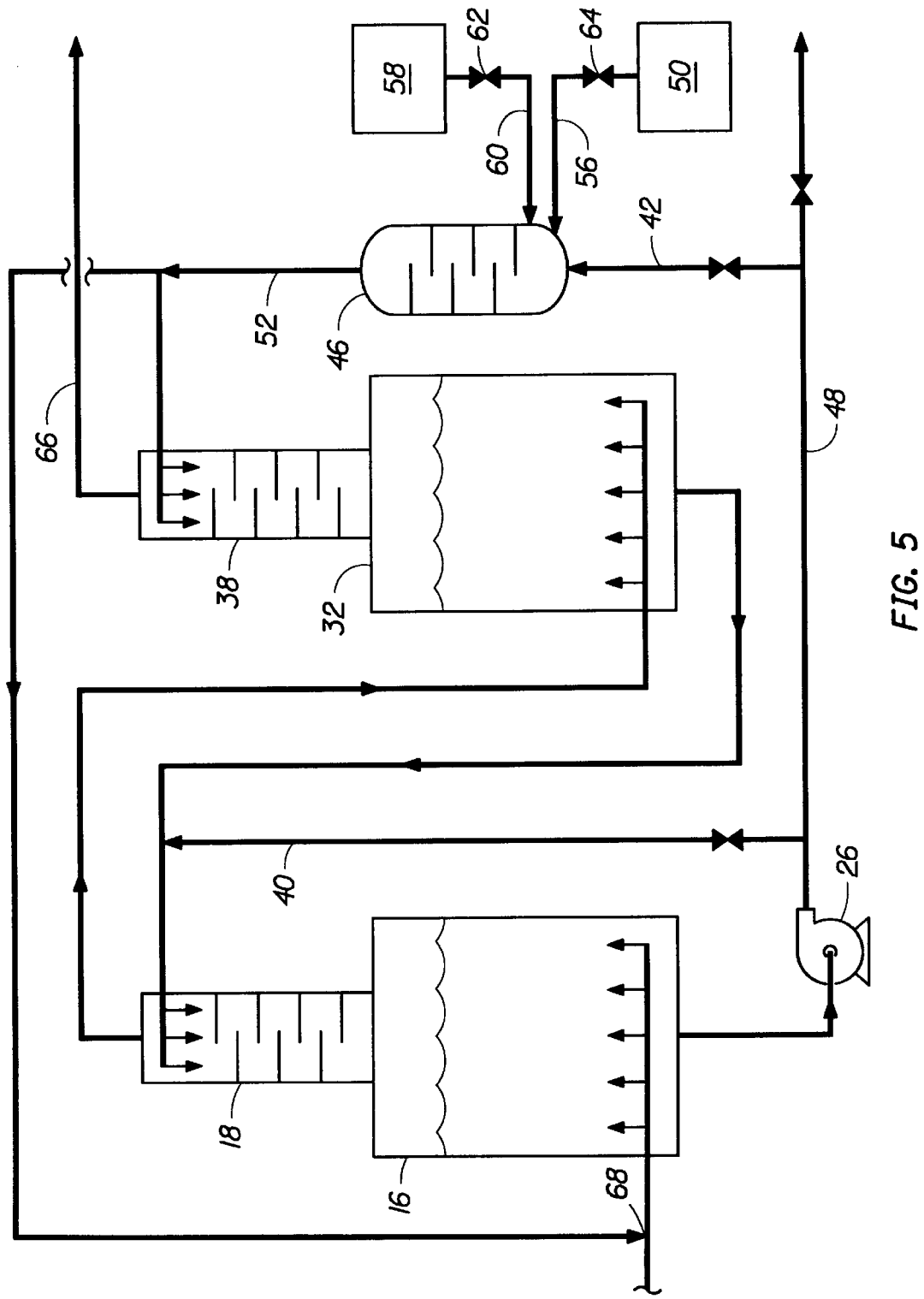
FIG. 5 is a schematic flow diagram of the system of FIG. 4 further providing for the on-site generation of the scavenging solution.

FIG. 5 is a schematic flow diagram of the system 30 of FIG. 4 further providing for the on-site generation of a fresh scavenging solution. An amine storage vessel 58 and an aldehyde storage vessel 50 are located near the site at which a gas containing sulfides is to be sweetened. While this is typically near the well-site, gas may be sweetened at any point according to the present methods. Control valves 62 and 64 are used to control the quantity of fluid that flows from the amine and aldehyde storage vessels as amine stream 60 and aldehyde stream 56, respectively. The ratio of flow through the valves 62 and 64 is determined by the particular reaction ratio desired, typically between about 2 and about 6 equivalents of hydrogen atoms bonded directly to a nitrogen atom in the amine for every equivalent of carbonyl groups in the aldehyde, and the degree of dilution of the reactants. The overall rate of scavenger production is determined by the gas stream flow rate through the system 30, the sulfide concentration within the gas, and the acceptable level of sulfide within the sweetened gas stream 66.

The reactants flow together and enter a reactor or static mixer 46 preferably having sufficient volume to provide the residence time necessary for the reaction to be complete. Since the aldehyde/amine reaction is exothermic, cooling may be required at times to keep the temperature in the desirable ranges. Cooling may be achieved, for example, by the use of a cooling device (not shown), such as a fin fan, refrigeration system or water jacket arrangement, in thermal communication with the reactor 46.

Furthermore, the reactor 46 may also receive some substantially spent scavenger solution from recycle stream 40 through line 42 for regeneration. In this case, the amount of aldehyde, preferably ethanedial, supplied to the reactor 46 will preferably be based on the amount of active hydrogens in both the aldehyde stream 56 and the line 42. Again, it is possible and perhaps desirable to supply an excess of ethanedial for the purpose of facilitating in-situ regeneration of liberated amines.

The reaction mixture may then be directly contacted with a sour gas stream. In accordance with the present invention, this contact may involve in-line injection (such as at point 68), bubble columns, spray columns or other liquid/gas contacting devices, alone or in combination. While columns 32, 38 are shown having a number of trays or baffles, the tower 32 may be an open-spray tower or contain packing or trays.

Figure 6:
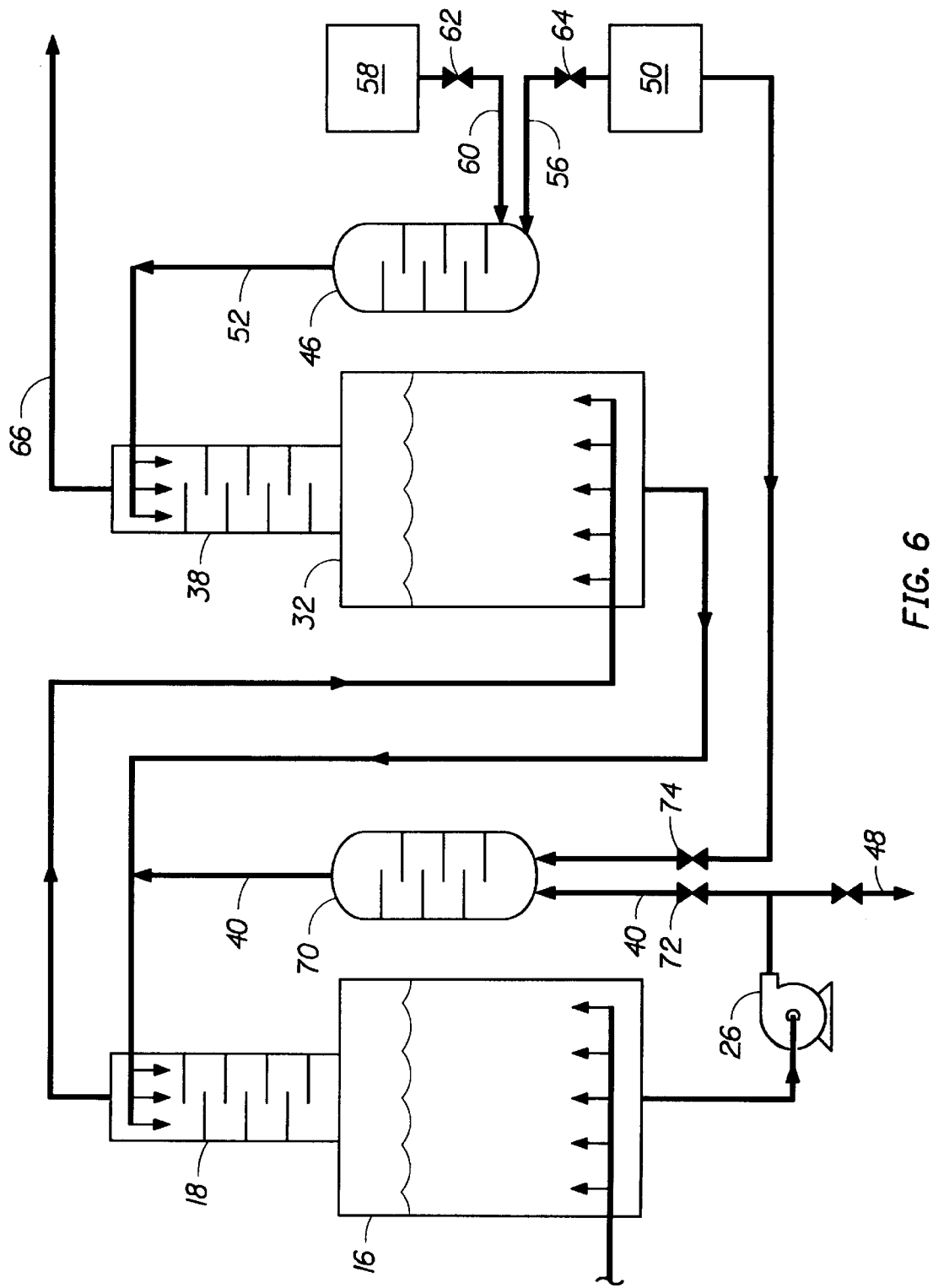
FIG. 6 is a schematic flow diagram of the system of FIG. 5 providing for on-site generation of a fresh scavenging solution and separate regeneration of a spent solution.

FIG. 6 is a schematic flow diagram of the system 30 of FIG. 5 providing for on-site generation of a fresh scavenging solution and separate regeneration of a spent solution. The on-site generation of a fresh scavenging solution is performed substantially as described with reference to FIG. 5. The separate regeneration process is performed in a dedicated reactor 70 which may be variously positioned within the system 30 but is shown receiving the recycle stream 40 and delivering the regenerated solution to column 18 of the first stage. A second stream is supplied to the reactor 70 from the aldehyde source 50 for reacting with the liberated amines. The control valves 72, 74 determine the relative flows of substantially spent solution and aldehyde into the reactor 70 and are preferably operated to provide one carbonyl group in the aldehyde for every two active hydrogens in the liberated amine. While this embodiment requires a second reactor, the regenerated solution, which is less reactive due to its dilution with fully reacted chemicals and water, is isolated in the first stage to avoid diluting the reactivity of the solution in the second stage.

While the foregoing is directed to the preferred embodiment of the present invention, other and further embodiments of the invention may be devised without departing from the basic scope thereof. The scope of the invention is determined by the claims which follow.

What is claimed is:

1. A process comprising the step of adding ethanedial to a partially spent sulfide scavenging solution containing a carbonate of monoethanolamine for the purpose of forming a sulfide scavenger.

2. A process comprising the steps of:
   (a) scavenging sulfides with a solution having at least one scavenger comprising a triazine;
   then (b) adding ethanedial to the solution; and
   then (c) scavenging additional sulfides.

3. A process comprising the steps of:
   (a) scavenging sulfides with a solution having at least one scavenger comprising a triazine;
   then (b) adding ethanedial to the solution;
   (c) adding monoethanolamine to the solution;
   then (d) scavenging additional sulfides.

4. A process comprising the steps of:
   (a) removing sulfides from a gas with a solution having at least one scavenger comprising the reaction product of an aldehyde and an amine;
   (b) adding ethanedial and monoethanolamine to a portion of the solution; and
   (c) removing additional sulfides from the gas with the solution.

5. The process of claim 4, wherein the aldehyde is formaldehyde and the amine is monoethanolamine.

6. The process of claim 4, wherein the reaction product of an aldehyde and an amine is a triazine.

7. The process of claim 4, wherein the aldehyde is ethanedial and the amine is monoethanolamine.

8. The process of claim 4, further comprising the step of discarding a second portion of the solution that is substantially spent.

9. A method comprising the step of adding ethanedial and monoethanolamine to a sulfide scavenger derived from monoethanolamine for the purpose of reacting with monoethanolamine or derivatives of monoethanolamine liberated from the sulfide scavenger upon exposure to sulfides.

10. A method comprising the step of adding ethanedial and monoethanolamine to a solution comprising a sulfide scavenger derived from monoethanolamine for the purpose of reacting with a reaction product formed when the sulfide scavenger reacts with sulfides.

11. A process comprising the steps of:
   (a) reclaiming monoethanolamine or a derivative of monoethanolamine from a first scavenger stream; and
   (b) reacting the reclaimed monoethanolamine or derivative of monoethanolamine with a dialdehyde to form a second scavenger stream.

12. The process of claim 11, further comprising the step of:
   (c) reacting sulfides from a gas stream with both the first and second scavenger streams, wherein the first scavenger stream contains triazines.

13. A process comprising the step of adding ethanedial and monoethanolamine to a partially spent sulfide scavenging solution containing a carbonate of monoethanolamine for the purpose of forming a sulfide scavenger.

14. A process comprising the steps of:
   (a) scavenging sulfides with a solution having at least one scavenger comprising a triazine;
   then (b) adding ethanedial to the solution; and
   then (c) scavenging additional sulfides.

* * * * *